Patented Oct. 3, 1922.

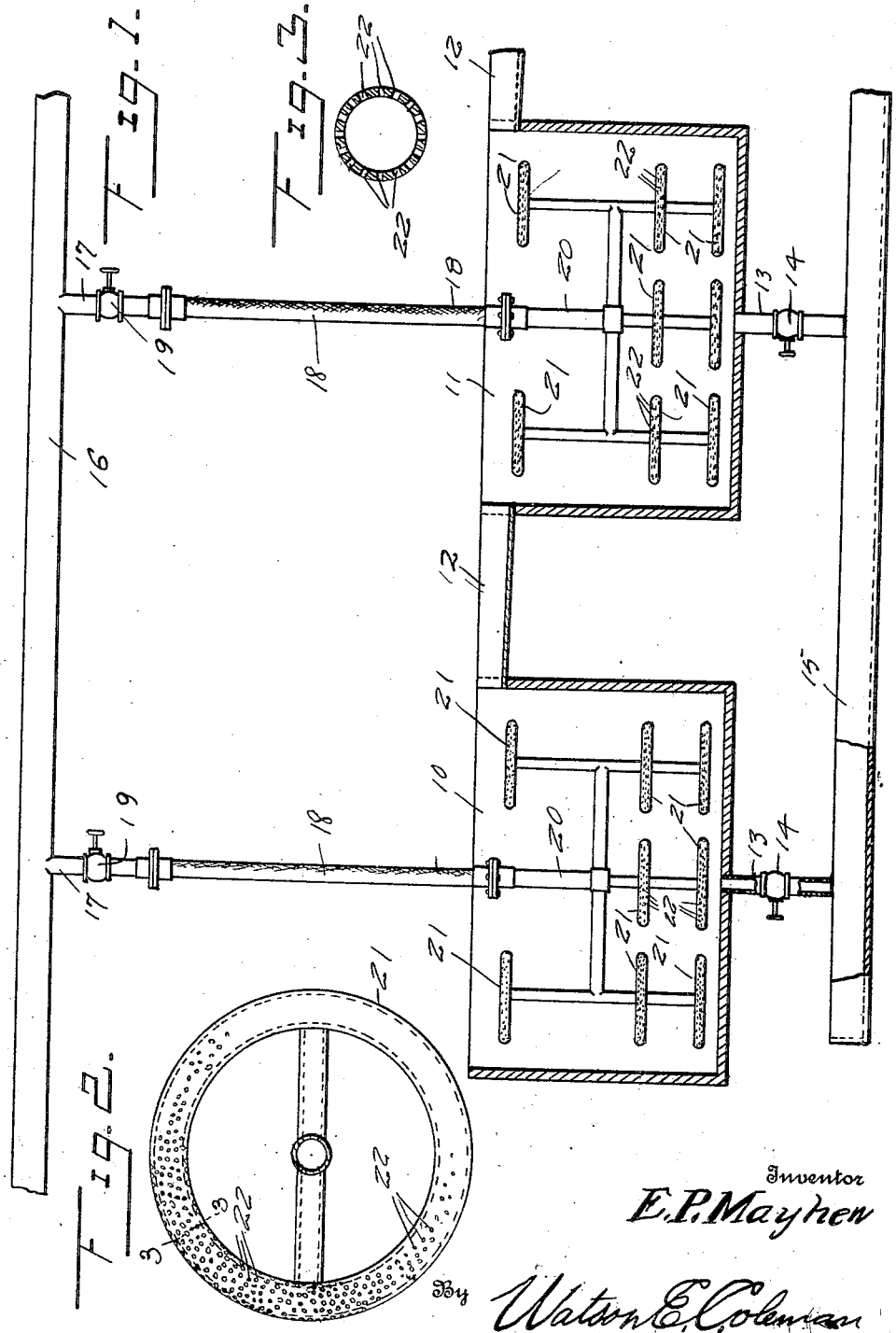

1,430,665

UNITED STATES PATENT OFFICE.

EARL P. MAYHEW, OF KIMBERLY, NEVADA.

ORE CLASSIFIER.

Application filed February 24, 1920. Serial No. 361,055.

*To all whom it may concern:*

Be it known that I, EARL P. MAYHEW, a citizen of the United States, residing at Kimberly, in the county of White Pine and State of Nevada, have invented certain new and useful Improvements in Ore Classifiers, of which the following is a specification, reference being had to the accompanying drawings.

This invention relates to concentrators or classifiers, and particularly to that form of concentrator or classifier in which the ore pulp or crushed ore is delivered to a washing tank and submitted to such agitation that the relatively heavy ore falls to the bottom of the tank, from which it may be withdrawn, and the relatively light materials, such as gangue, sand, etc., are carried off to the next adjacent tank for further washing.

The general object of my invention is to provide a very simple mechanism of this character in which the agitation of the ore is secured by the action of jets of water ejected with considerable force into a tank full of water and ore.

A further object is to provide a mechanism of this kind embodying a series of tanks, the tanks being connected so that the water will flow from one tank to another in series, a water pipe, preferably of flexible material, entering each of said tanks and connected to a plurality of sprayers disposed within the tank and so designed as to discharge water in sprays in all directions to thus thoroughly agitate the contents of the tank and wash away the light material, leaving the heavy material in the tank.

A further object in this connection is to provide a construction of this character in which the pipe supporting the series of sprayers for each tank is flexible so that they may be readily removed, so that the sprayers may be shifted to different positions in the tank to thoroughly wash the material therein and so that different forms of sprayers may be attached to the sprayer carrying pipe.

A further object is to provide sprayers so formed that every portion of the water in the tank is agitated by sprays of water ejected from the sprayers and so that these sprayers may be disposed very near the bottom of the tank and will discharge downward thereagainst, as well as discharging laterally and upwardly.

Other objects will appear in the course of the following description.

My invention is illustrated in the accompanying drawings, wherein:—

Figure 1 is a sectional view of a series of classifying tanks constructed in accordance with my invention;

Figure 2 is a top plan view of one of the sprayer heads;

Figure 3 is a section on the line 3—3 of Figure 2;

Referring to these drawings, 10 and 11 designate two washing tanks or classifying tanks of a series. There may be any number of these tanks in a series and, therefore, I do not wish to be limited to the use of merely two tanks. Each pair of tanks is connected by a trough 12, and leading from each tank is a discharge pipe 13 having therein a regulating valve 14 and leading into a chute, trough, pipe line or other conduit 15 whereby concentrates or classified ore may be drawn off.

Extending above the tanks is a main feed water line 16, and extending downward from the main feed water line 16 are a plurality of short pipe sections 17 and a pipe section 18 which may be flexibly connected to the pipe section 17 or be made of flexible material or otherwise be formed so that it may be moved about with reference to tank and with reference to the pipe section 17 without detaching it from its engagement with the pipe section 17. The pipe section 17 is provided with a controlling valve 19. To the lower end of the pipe section 18 is connected a pipe section 20 having branches leading therefrom, these branches discharging into sprayer heads 21. Each of these sprayer heads is shown as approximately annular in form and provided with perforations 22, some of these perforations discharging downwardly, others laterally, and others upwardly. I have illustrated three sets of these sprayer heads disposed at various levels so that the contents of the tank will be thoroughly agitated by the sprays of water projected therethrough.

It is to be noted that the water in the main line 16 is under pressure so that the sprays will be discharged with great force from the nozzles in the sprayer heads. I do not wish to be limited to any particular form of sprayer head, nor to the particular form of the nozzles. Certain of the sprayer heads are disposed very close to the bottom of the tank so as to cause a spray to be discharged downward toward the bottom of the tank as well as sidewise and upwards. It is absolutely necessary for the proper classifying and concentrating of material that there be a downward spray as well as a sidewise spray, as the downward jets of water will agitate the material in the bottom of the tank and will cause the valueless material, waste particles, gangue and other like material that has escaped the upward spray to be separated from the heavier particles and to rise through the tank and be discharged over the top of the tank and thus not mix with the classified material in the bottom of the tank. If it were not for these downward sprays striking against the material in the bottom of the tank, the material that once reached the bottom of the tank would lie dormant, while with my construction a continual agitation of the ores or materials in the bottom of the tank occurs so long as the ore is allowed to remain in the tank. If mercury is used in the bottom of the tank, the agitation of the liquid in the tank, caused by the discharge of these sprays of water, assists the mercury in collecting the free particles of gold and silver that may sink to the bottom of the tank, the mercury always being more active when stirred about and clean, the agitation of the water in the bottom of the tank caused by the downward sprays keeping the mercury clean, and it is to be particularly noted that the pipes 18 lead into the open top of the tank, thus permitting these pipes 18 to be readily removed by simply raising them out of the tank, it being necessary at times to remove the spray pipes or heads in order to stir up the material that has been deposited in the bottom where the same has become packed. This, however, would rarely, if ever, occur with my classifier and concentrator by reason of the continual downward and lateral sprays.

By mounting the spray heads on a pipe section 18 which is flexibly connected to the pipe section 19, the spray heads may be moved around in the tank to any desired position, or the spraying section 20 may be removed entirely from the pipe 18 and a nozzle placed on the pipe 18 and this used to agitate the material or to force and wash the classified material into the overflow or discharge pipe or trough 12. Furthermore, this construction permits the quick removal of the perforated pipes, and heads with different forms of nozzles or different sizes of perforations may be placed thereon quickly as the nature of the material placed in the tank may require these changes. Thus, materials of a slimy or sticky nature require considerably more water and water pressure to properly handle and classify them than ores or materials of a different class. Of course, it is to be understood that the ores are to be crushed to different mesh according to the grade and nature thereof, and this crushing is accomplished before the ores are placed in the first tank. The water pressure will also be adjusted according to the character of the ore, and this water pressure may be controlled by the valve 17. In the case of gold bearing ores or gravel, mercury may be used in the bottom of each tank to assist in the gathering of the free gold therein.

While I have illustrated one particular form of my invention, it is to be understood that the classifier may be readily made in other forms without departing from the spirit of the invention.

I claim:—

1. A classifier and concentrator of the character described including a plurality of tanks arranged in series, overflow conduits connecting each tank to the next tank in the series and disposed in the tops of the tanks, a common discharge conduit disposed above all of the tanks and having branches extending into the bottom of each tank, each branch being provided with a valve, a main water pipe extending from the tanks and having branches extending downward and provided with valves, a flexible hose connected to said branches and extending down into the tanks, a pipe disposed within each tank and connected to the flexible pipe and having radiating branches, vertical pipes connected to the ends of said radiating branches, and sprayer heads mounted upon said vertical pipes, certain of the sprayer heads being disposed adjacent the bottom wall of the tank, said sprayer heads having perforations discharging upward, downward and laterally.

2. A classifier and concentrator of the character described including a plurality of tanks arranged in series, overflow conduits connecting each tank to the next tank in the series and disposed in the tops of the tanks, a common discharge conduit disposed above all of the tanks and having branches extending into the bottom of each tank, each branch being provided with a valve, a main water pipe extending from the tanks and having branches extending downward and provided with valves, a flexible hose connected to said branches and extending down into the tanks, a pipe disposed within each tank and connected to the flexible pipe and having radiating branches, vertical pipes connected to the ends of said radiating branches, and a plurality of sets of sprayer heads mounted upon the vertical pipes at different levels, said sprayer heads having perforations discharging upward, downward and laterally.

In testimony whereof I hereunto affix my signature.

EARL P. MAYHEW.